United States Patent [19]

Kreeley

[11] 4,392,512
[45] Jul. 12, 1983

[54] RELIEF VALVE

[75] Inventor: Bruce K. Kreeley, Bristol, Pa.

[73] Assignee: The Singer Company, Stamford, Conn.

[21] Appl. No.: 270,167

[22] Filed: Jun. 3, 1981

[51] Int. Cl.³ ............................................. F16K 17/06
[52] U.S. Cl. .................... 137/496; 137/508; 137/859
[58] Field of Search ............ 137/496, 508, 516.15, 137/859

[56] References Cited

U.S. PATENT DOCUMENTS

| | | |
|---|---|---|
| 2,348,104 | 5/1944 | Beddoes . |
| 2,781,051 | 2/1957 | Hawley . |
| 2,854,996 | 10/1958 | Hughes ........................... 137/859 X |
| 3,032,060 | 5/1962 | Huffman ......................... 137/859 X |
| 3,073,339 | 1/1963 | Stelzer ............................ 137/859 X |
| 3,392,751 | 7/1968 | Pommershein et al. . |
| 3,730,215 | 5/1973 | Conery et al. . |
| 4,125,127 | 11/1978 | Harter . |
| 4,129,143 | 12/1978 | Hoffmann ....................... 137/859 X |

FOREIGN PATENT DOCUMENTS 2450301 4/1976 Fed. Rep. of Germany ...... 137/859

Primary Examiner—Robert G. Nilson
Attorney, Agent, or Firm—David L. Davis; Robert E. Smith; Edward L. Bell

[57] ABSTRACT

A pressure relief valve includes a two-piece housing having therein a generally circular diaphragm backed by a spring biased plate. The outer edge of the diaphragm is captured between the two pieces of the housing and to provide a first sealing area. The central portion of the diaphragm has a circular opening therein with an annular sealing lip formed thereabout. The sealing lip provides a seal when the spring biased plate moves the diaphragm against a flat circular seat. When pressure at the inlet of the housing overcomes the spring biasing force, the diaphragm is moved away from the seat and the gas is relieved through an outlet in the housing.

5 Claims, 3 Drawing Figures

RELIEF VALVE

DESCRIPTION

BACKGROUND OF THE INVENTION

This invention relates to relief valves and, more particularly, to a gas pressure relief valve which may be field retrofit onto an existing domestic gas pressure regulator.

At the present time, there are many pressure regulators installed for house service applications which function solely as gas pressure regulators. In other words, they merely regulate the pressure of gas in the outlet. However, as these regulators age, they tend not to shut off completely tight so that they let a small flow of natural gas get past the soft seat of the regulator. Under normal circumstances, a small amount of extra gas going past the regulator is no problem because most homes have pilot lights in their appliances that are constantly burning and any leakage of gas merely causes the pilot lights to burn a little bit brighter. However, under present day conditions where energy conservation is at a premium, many of the new appliances such as, for example, hot water heaters, stoves, ovens, heating furnaces, etc., do not have pilot lights. Instead, they utilize an electric ignition. Under such circumstances, if there is a flow of gas past the regulator, a dangerous gas pressure buildup can occur inside the home.

Normally, when regulators are new and shut off tightly, there is a penalty of slightly higher pressure on the downstream side. When this higher pressure is coupled with a little bit of sealing seat wear, there is a little extra flow at a slightly higher pressure and if this gas is not being burned by a pilot light, this can create a dangerous situation.

It is therefore an object of this invention to provide a pressure relief valve for a regulator used in house service applications.

Regulators exist that have built in pressure relief valves. However, it is economically undesirable to shut off the gas, take the old regulator out and put a new regulator in. This is both expensive and time consuming.

It is therefore an additional object of this invention to provide a pressure relief valve which may be retrofit onto an existing regulator without removing the regulator from the gas line.

SUMMARY OF THE INVENTION

The foregoing and additional objects are attained in accordance with the principles of this invention by providing a gas pressure relief valve comprising a resilient diaphragm having a first side, a second side, and a central opening, the diaphragm being formed with an annular sealing lip about the central opening on the first side thereof; a body member including a central seat, an inlet to a source of gas to be pressure relieved, and a continuous shoulder adapted to contact the periphery of the first side of the diaphragm; means for biasing the diaphragm in a direction such that the sealing lip is forced in sealing engagement with the seat, the biasing means exerting sufficient biasing force against the diaphragm so that the sealing lip remains sealingly engaged with the seat when the gas pressure at the inlet is below a predetermined value; a top member including an outlet for relieved gas and a continuous shoulder adapted to contact the periphery of the second side of the diaphragm opposite the shoulder of the body member; and means for connecting the body member to the top member so that the periphery of the diaphragm is maintained sealingly engaged between the shoulders of the body and top members.

BRIEF DESCRIPTION OF THE DRAWINGS

The foregoing will be more readily apparent upon reading the following description in conjunction with the drawing wherein.

DETAILED DESCRIPTION

Figure 1:
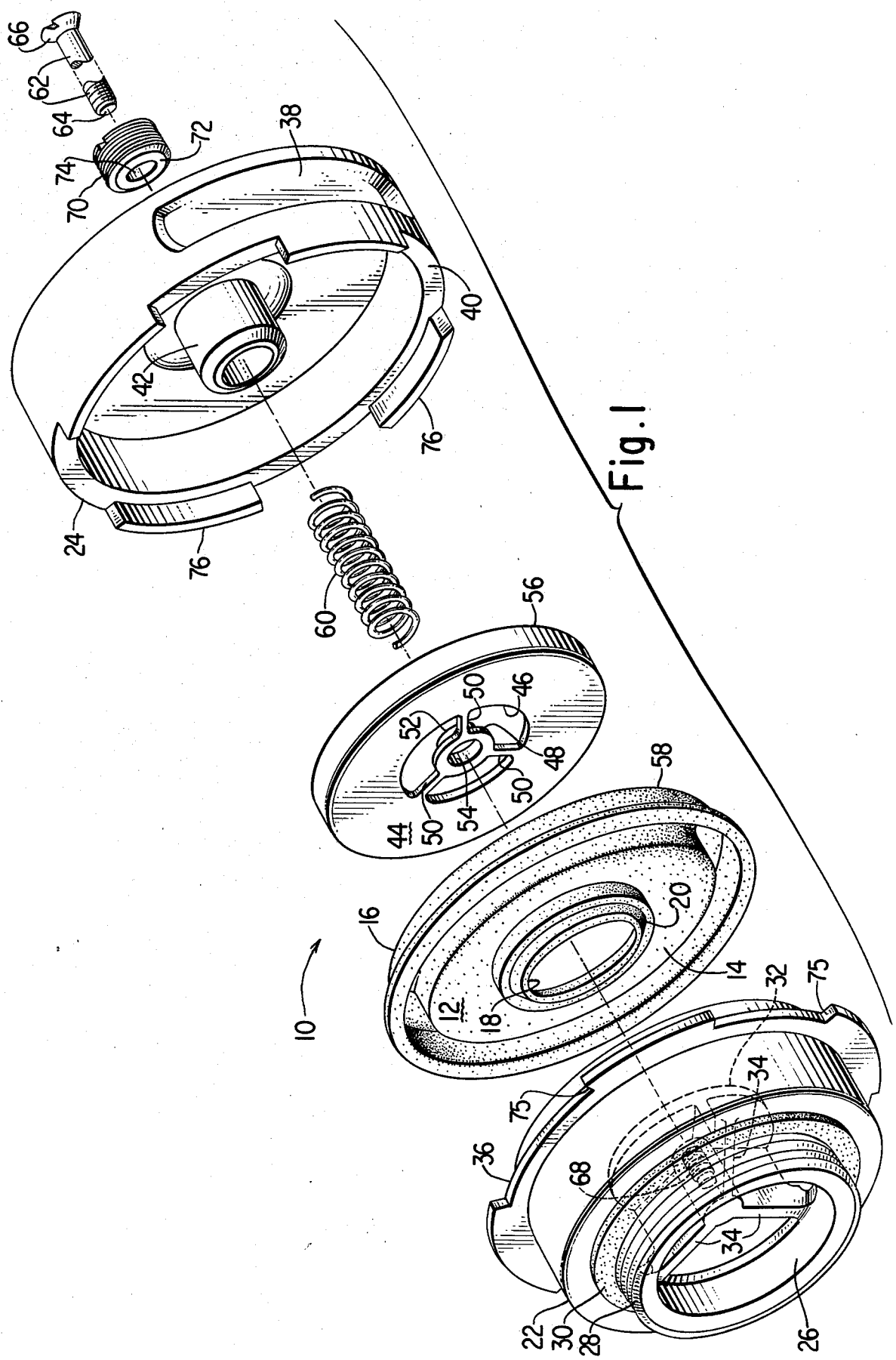
FIG. 1 is an exploded perspective view of a relief valve constructed in accordance with the principles of this invention.

Referring to the drawings, wherein like elements in different figures thereof have the same reference character applied thereto, FIG. 1 is an exploded perspective view of a pressure relief valve, designated generally by the reference numeral 10, constructed in accordance with the principles of this invention. The operating element in the valve 10 is a resilient diaphragm 12 which has a first side 14 and a second side 16. The diaphragm 12 is formed with a central opening 18 and an annular sealing lip 20 about the central opening 18 on the first side 14 of the diaphragm 12.

The valve 10 further includes a body member 22 and a top member 24. The body member 22 includes an inlet region 26 which is adapted for connection to a source of gas which is to be pressure relieved. Toward that end, the body member 22 is provided with an externally threaded extension 28 which is adapted to be screwed into an internally threaded opening to the gas source and sealed thereto by means of a sealing gasket 30. The body member 22 also includes a central seat 32 which is connected to the remainder of the body member 22 by means of a plurality of ribs 34. Body member 22 also includes a continuous shoulder 36 which is adapted to contact the periphery of the first side 14 of the diaphragm 12.

Figure 2:
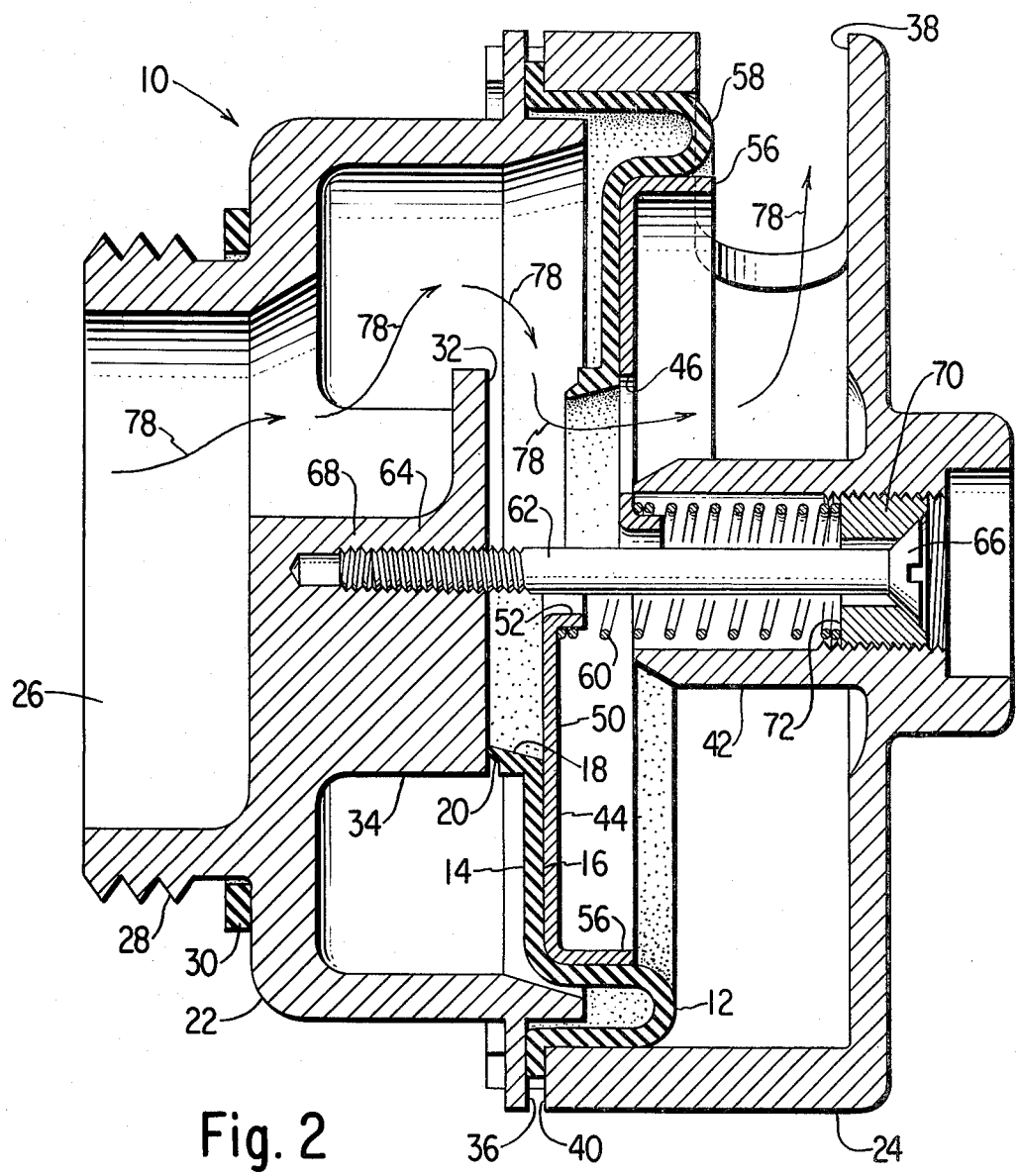
FIG. 2 is a cross-sectional view of the assembled valve of FIG. 1 wherein the top half shows the valve in the fully open position and the bottom half shows the valve in the fully closed position.

The top member 24 includes an open outlet 38 for allowing over-pressure gas to be relieved therethrough. The top member 24 also includes a continuous shoulder 40 adapted to contact the periphery of the second side 16 of the diaphragm 12 opposite the shoulder 36 of the body member 22. The top member 24 is also formed with a hollow cylindrical projection 42 which is internally threaded for at least a portion of its length, as shown in FIG. 2.

The valve 10 also includes a plate 44. The plate 44 has a central opening 46 and an island region 48 disposed within the central opening 46 and connected to the plate 44 by a plurality of relatively slender spokes 50 which do not substantially block the central opening 46. The spokes 50 illustratively extend radially outwardly from the island region 48. The island 48 has, on the side opposite the side of the plate disposed adjacent the diaphragm 12, an upstanding wall 52, radially inward of which there is an opening 54. Preferably, the plate 44 has an upstanding wall 56 at its outer periphery, which upstanding wall 56 lies within the convoluted portion 58 of the diaphragm 12.

To provide a biasing force, a helically wound compression spring 60 is provided. The spring 60 has one end thereof fitted around the wall 52 and the other end fitted inside the projection 42. This spring 60 provides a biasing force through the plate 44 against the diaphragm 12 to maintain the sealing lip 20 in sealing engagement with the seat 32.

To connect together the parts shown in FIG. 1 to provide an operative valve assembly, there is provided a connecting member 62, illustratively a screw. The connecting member 62 is externally threaded at one end 64 and has a slotted head 66 at the other end. To accommodate the threaded end 64, the seat 32 is provided with an internally threaded opening 68 therein. Accordingly, the connecting member 62 extends through the projection 42, inside the spring 60, through the opening 54 of the island region 48 of the plate 44, through the opening 18 of the diaphragm 12, and is threadably secured into the opening 68 of the seat 32. When the connecting member 62 is tightened, the periphery of the diaphragm 12 is maintained sealingly engaged between the shoulder 36 of the body member 22 and the shoulder 40 of the body member 24.

In order to vary the biasing force exerted by the spring 20, there is provided a plug 70. The plug 70 is formed with external threads and is threaded into the internally threaded projection 42. The spring 60 bears against inward surface 72 of the plug 70. By varying the position of the plug 70, this provides a positionally adjustable stop for the spring 60 to vary the compression thereof, and hence the compressive biasing force exerted by the spring 60 to the diaphragm 12. The plug 70 is formed with a longitudinal bore 74 therethrough. The bore 74 is of sufficient size to allow the connecting member 62 to pass therethrough but not to allow the head 66 from passing therethrough.

To prevent the top member 24 from rotating relative to the body member 22 when the valve 10 is assembled or installed on a regulator in the field, the construction of these parts is such that the shoulder 36 of the body member is notched at 75 and the outer surface of the top member 24 has longitudinal extensions 76 which complementarily extend into the notched shoulder 36. Additionally, the notches 75 and extensions 76 allow for repositioning of the direction of the outlet 38 without a complete disassembly of the entire unit by merely loosening the connecting member 62 sufficiently to allow the extensions 76 to clear the notches 75. Further, the extensions 76 provide for a positive transmission of installation torque from the top member 24 to the body member 22.

FIG. 2 is a cross-sectional view of the assembled valve 10 wherein the upper half illustrates the valve 10 in its fully opened position and the lower half illustrates the valve 10 when it is fully closed. When the pressure at the inlet 26 provides a force against the first side 14 of the diaphragm 12 which is less than the biasing force exerted by the spring 60, the annular sealing lip 20 is maintained in sealing engagement with the seat 32, as shown in the lower half of FIG. 2. However, when the inlet pressure provides a force greater than the force exerted by the spring 60, the force is transmitted through the diaphragm 12 and the plate 44 to compress the spring 60, as shown in the upper half of FIG. 2. This brings the lip 20 out of sealing engagement with the seat 32 and allows the over-pressure gas to be relieved from the inlet 26, around the seat 32, through the opening 18 of the diaphragm 12, through the opening 46 of the plate 44, and to the outlet 38, as illustrated by the arrows 78.

Figure 3:
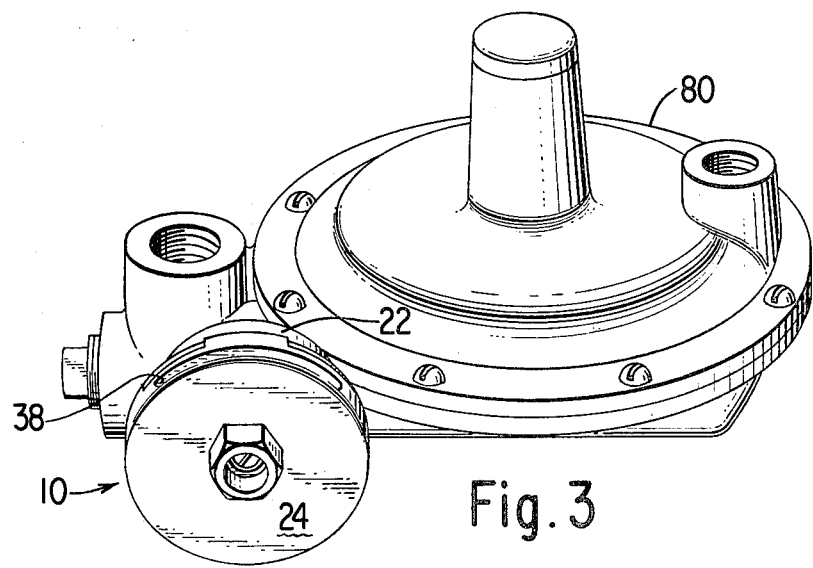
FIG. 3 illustrates how the valve of FIGS. 1 and 2 may be installed on a pressure regulator.

FIG. 3 illustrates the mounting of the valve 10 on an otherwise unrelieved regulator 80, illustratively a type K pressure regulator manufactured by the Meter Division of The Singer Company. The valve 10 is designed so that its externally threaded portion 28 may be secured in an otherwise plugged inspection port on the downstream side of the regulator 80. This may be done in the field without removing the regulator 80 from the line. In order to prevent excessive loss of gas while the valve 10 is being installed, the line is preferably "bagged" wherein a transparent plastic bag is placed over the regulator 80 and the line to which it is connected. The relief valve 10 and an appropriate wrench are within the bag and the bag is only open to the inspection port which is to be unplugged. The wrench is then utilized by gripping it from outside the bag to remove the inspection port plug and the valve 10 is then inserted and threadably secured to the inspection port. Accordingly, the only gas that is lost is that gas which fills the bag.

The above described valve constructed in accordance with the principles of this invention provides a number of distinct features and advantages. The diaphragm 12 acts as both a pressure sensing element and a throttling element. Additionally, it functions as a sealing element at two places, i.e., at its periphery and at the sealing lip 20. The above construction provides a constant effective diaphragm area. Further, the diaphragm 12 has a rolling action when it is moved by excessive pressure so that it acts as a frictionless piston.

Accordingly, there has been disclosed a relief valve assembly. It is understood that the above-described embodiment is merely illustrative of the application of the principles of this invention, and it is only intended that this invention be limited by the scope of the appended claims.

I claim:

1. A gas pressure relief valve comprising:
    a resilient diaphragm having a first side, a second side, and a central opening, said diaphragm being formed with an annular sealing lip about the central opening on the first side thereof;
    a body member including a central seat, an inlet to a source of gas to be pressure relieved, and a continuous shoulder adapted to contact the periphery of the first side of said diaphragm;
    a top member including an outlet for relieved gas and a continuous shoulder adapted to contact the periphery of the second side of said diaphragm opposite the shoulder of said body member;
    means for connecting said body member to said top member so that the periphery of said diaphragm is maintained sealingly engaged between the shoulders of said body and top members;
    a plate having a central opening, said plate being disposed adjacent the second side of said diaphragm with the central opening of the plate being aligned with the central opening of the diaphragm; and
    a compression spring positioned intermediate said plate and said top member to provide a biasing force to said diaphragm through said plate to force said sealing lip in sealing engagement with said seat, said biasing force being sufficient so that said sealing lip remains sealingly engaged with said seat when the gas pressure at the inlet is below a predetermined value;

said compression spring being helically wound, said plate being formed with an island region in its central opening connected to the plate by relatively slender spokes which do not substantially block said central opening, said island region having an upstanding wall on the side of the plate opposite the side disposed adjacent said diaphragm, a first end of said spring being fitted around said wall, said top member being formed with an internal hollow cylindrical projection, and the second end of said spring being fitted inside said projection.

2. The valve according to claim 1 wherein said biasing means further includes means for adjusting the biasing force exerted by said spring.

3. The valve according to claim 2 wherein said hollow cylindrical projection is formed with internal threads and said adjusting means includes an externally threaded plug disposed within and threadedly engaged with said projection, said plug providing a positionally adjustable stop for the second end of said spring to vary the compression thereof.

4. The valve according to claim 3 wherein said island region of said plate is formed with an opening radially inward of said upstanding wall, said plug has a longitudinal bore therethrough, said seat has an internally threaded opening therein, and said connecting means includes a rod having external threads at one end thereof adapted to be threadedly secured in the opening of said seat and a head at the other end thereof of a size sufficient to prevent said head from passing through the bore of said plug, said rod extending through the bore of said plug, inside said spring, through the opening of said plate island region, through the central opening of said diaphragm, and is threaded into the opening of said seat.

5. The valve according to claim 1 wherein the continuous shoulder of said body member includes at least one notch therein and said top member further includes a longitudinal extension adapted to complementarily extend into said notch.

* * * * *